US005336541A

United States Patent [19]

Kobayashi

[11] Patent Number: 5,336,541

[45] Date of Patent: Aug. 9, 1994

[54] LINERLESS PRESSURE-SENSITIVE LABEL

[75] Inventor: Junichi Kobayashi, Tokyo, Japan

[73] Assignee: Ko-Pack Corporation, Tokyo, Japan

[21] Appl. No.: 27,112

[22] Filed: Mar. 4, 1993

Related U.S. Application Data

[63] Continuation-in-part of Ser. No. 7,373, Jan. 21, 1993, which is a continuation of Ser. No. 740,987, Aug. 6, 1991, abandoned.

[30] Foreign Application Priority Data

May 9, 1991 [JP] Japan .................................. 3-132236

[51] Int. Cl.$^5$ ............................ B32B 7/06; B32B 7/14

[52] U.S. Cl. ......................................... 428/40; 428/77; 428/202; 283/81

[58] Field of Search ........................ 428/40, 42, 77, 54, 428/55, 56, 198, 201, 202; 283/81

[56] References Cited

U.S. PATENT DOCUMENTS

| | | | |
|---|---|---|---|
| 798,313 | 8/1905 | Alexander | 428/198 |
| 1,619,081 | 10/1924 | McLaurin | 156/289 |
| 2,109,583 | 3/1938 | Bennett | 428/236 |
| 2,282,177 | 5/1942 | Dike et al. | 428/479 |
| 2,411,328 | 11/1946 | MacNab | 428/198 |
| 3,203,823 | 8/1965 | Grimes | 428/198 |
| 3,257,228 | 6/1966 | Reed | 428/40 |
| 3,312,005 | 4/1967 | McElroy | 428/42 |
| 3,385,743 | 5/1968 | Backberg | 428/191 |
| 3,464,842 | 9/1969 | Jackstadt | 428/195 |
| 3,554,835 | 1/1971 | Morgan | 428/198 |
| 3,900,642 | 8/1975 | Michel | 428/124 |
| 4,204,017 | 5/1980 | Hefele | 428/198 |
| 4,235,459 | 11/1980 | Callahan | 428/43 |
| 4,460,634 | 7/1984 | Hasegawa | 428/124 |
| 4,768,810 | 9/1988 | Mertens | 428/40 |
| 5,021,110 | 6/1991 | Kobayashi | 156/249 |

FOREIGN PATENT DOCUMENTS 2909276 9/1980 Fed. Rep. of Germany .

*Primary Examiner*—Alexander S. Thomas
*Attorney, Agent, or Firm*—Frishauf, Holtz, Goodman & Woodward

[57] ABSTRACT

An improved linerless pressure-sensitive label construction wherein label sheets carrying pertinent messages are pasted together with pressure-sensitive adhesive without using a release liner, and by separating the pasted-together label sheets, each separated section can be used as a label. Strips of release agent are provided at a given interval on the top and the bottom label sheets on their respective facing faces, the strips being arranged in a positionally staggered manner, so that the strips of release agent on one of the label sheets will come in contact with the strips of adhesive on the other. The strips of adhesive on either one of the label sheets are separated from one another by a narrow gap, so that the strips of adhesive which hold the top and the bottom label sheets together are separated from each other at the narrow gap and also from the strips of release agent on the other label sheet when the top and the bottom label sheets are peeled off from each other, whereby the label sheets can be easily separated.

10 Claims, 4 Drawing Sheets

LINERLESS PRESSURE-SENSITIVE LABEL

CROSS REFERENCE TO RELATED APPLICATIONS

This application is a continuation-in-part of prior application Ser. No. 08/007,373 filed Jan. 21, 1993 (pending) (the entire contents of which are incorporated herein by reference), which in turn is a continuation of prior application Ser. No. 07/740,987 filed Aug. 6, 1991 (abandoned).

BACKGROUND OF THE INVENTION AND RELATED ART STATEMENT

The present invention relates to a linerless pressure-sensitive label construction in which plural label sheets printed with pertinent data are pasted on one another without using a release liner, so that by peeling off the label sheets from each other, each sheet can be used as a label.

The prior art pressure-sensitive labels comprise label sheets that are provided with adhesive on the back and that are each pasted on the surface of a release liner. To use the label sheets, each sheet is peeled off from the release liner and pasted on a product or a container. The release liner of such label sheet therefore serves merely as a support which protects the adhesive on the label sheet until the label sheet is peeled off and pasted on a product or container. After the label sheet is used for its intended purpose, the release liner is discarded.

However, the release liner is usually made from relatively expensive glassine paper or super-calendered kraft paper of closely arranged short fibers in order to prevent the release material such as silicone which is coated on the release liner from unnecessarily permeating into fibers of the paper. It would therefore be highly uneconomical in terms of conservation of resources to discard such expensive paper after the label sheets are used.

To eliminate the release liner, reduce the cost of pressure-sensitive labels, and provide sheets of labels from which individual labels may be detached easily, linerless pressure-sensitive labels are known in the art such as disclosed in U.S. Pat. No. 3,312,005 (McElroy). According to McElroy, as shown in FIG. 9 of the present application, strips 4 and 5 of release material are provided on the back of label sheets 1 and 2 at a given interval and are arranged in a positionally staggering manner. The label sheets 1 and 2 are respectively coated with adhesive 3 on their back and then pasted together.

Thus, as shown in FIG. 10 of the present application, when the label sheets 1 and 2 are detached from each other, strips of adhesive *3a* on one of the label sheets 1 are peeled off from the corresponding strips 5 of release material of the other label sheet 2. Likewise, strips of adhesive *3b* of the other label sheet 2 are also peeled off from the corresponding strips 4 of release material. In this way, the peeled apart label sheets 1 and 2 can be used for their original intended purposes.

Labels of this type do not require a lining of release paper on their back. By detaching the label sheets that are pasted together, these label sheets can be fully utilized without any waste and are therefore most economical. However, such economical labels are not fully utilized today because of the following reasons. Strips of adhesive *3a*, *3b* of one of the label sheets 1 or 2 are contacted with the strips of release material 4 or 5 of the other label sheet, allowing detaching of the sheets from each other. However, strips of adhesive *3a* of the label sheet 1 and the strips of adhesive *3b* of the label sheet 2 which come adjacent to the former when pasted together are actually in one continuous form, as shown in FIG. 9 of the present application. Thus, when the label sheets 1 and 2 are detached from each other, the portions of adhesive *3a* and adhesive *3b* constituting one continuous member cannot be severed into well defined strips. The boundaries *3c* between these strips are forcibly cut off, causing threading 6 from both of the strips *3a* and *3b*, as shown in FIG. 10 of the present application.

When the strips of adhesive 3 cannot be adequately severed at the boundaries between the strips 4 and 5 of the release material to thereby cause threading 6 of the adhesive, the surface of the severed strips *3a*, *3b* of adhesive 3 will become untidy and coarse. Moreover, because it requires force to pull apart the strips of adhesive *3a* and *3b*, the label sheets 1 and 2 cannot be smoothly detached from each other like the general purpose labels using release paper and the appearance of the label as a product is severely damaged. The inadvertent threading 6 hanging from the label edge would adhere on the surface of an object to which the label is to be attached, leaving bumps on said surface and thus greatly damaging the appearance of the label when attached.

SUMMARY OF THE INVENTION

The present invention therefore aims at eliminating the defects encountered in the prior art, and the object of the present invention is to provide a linerless pressure-sensitive label construction in which top and bottom label sheets that are pasted together can be conveniently detached from each other so that each label sheet can be effectively used as a label.

More specifically, the linerless pressure-sensitive label construction according to the present invention is such that the label sheets are provided with strips of release material at a given interval and arranged in a positionally staggering manner on their respective faces on which they are pasted. Strips of adhesive are also arranged in between said strips of release material on the back of each label sheet. The adhesive strips are so arranged that there is a narrow gap between one strip of adhesive on one of the label sheets and that on the other label sheet coming next to the strip on the former label sheet, and each of these strips come in contact with the strips of release material on the other label sheet at corresponding positions.

Because there is a gap between a strip of adhesive on one label sheet and that on the other coming next to the former when the label sheets are pasted together back-to-back, and because these strips of adhesive on one label sheet are in contact with the strips of release material on the other label sheet, each strip of adhesive is distinctly separated from the others at the gap and therefore can be easily peeled off from the corresponding strip of release material without causing threading of the adhesive.

BRIEF DESCRIPTION OF THE DRAWINGS

Other objects and advantages of this invention will become apparent when taken in conjunction with the description herebelow of some embodiments shown in the accompanying drawings.

DETAILED DESCRIPTION OF THE PREFERRED EMBODIMENTS

Figure 1:
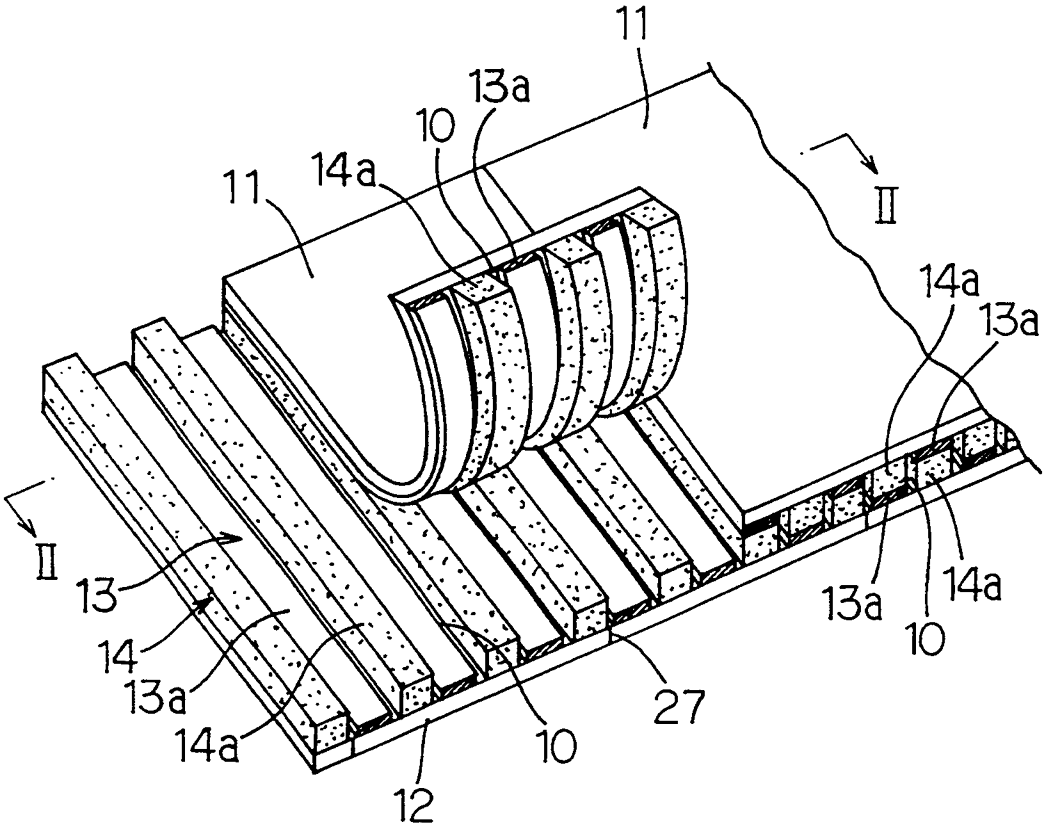
FIG. 1 is a partial perspective view to show the construction of the linerless pressure-sensitive label according to one embodiment of the present invention.
Figure 2:
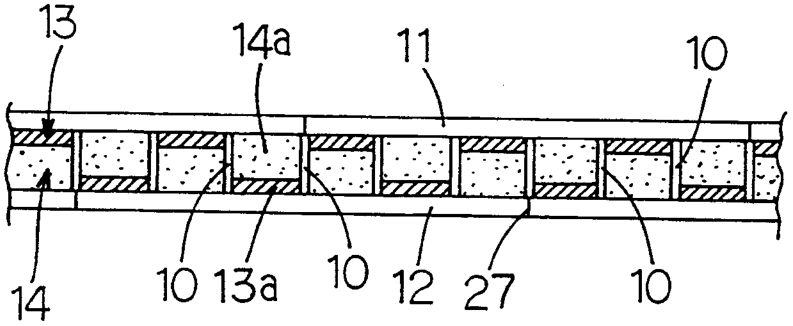
FIG. 2 is a sectional view along the line II—II of FIG. 1.

Preferred embodiments of the linerless pressure-sensitive label construction according to the present invention will now be described by referring to the accompanying drawings. The pressure-sensitive label in one embodiment, as shown in FIG. 1 and 2, comprises a top label sheet 11 and a bottom sheet 12, both of which are made of paper or film that can be printed on. On the backs of the top and the bottom label sheets 11 and 12, strips 13*a* of release material 13 and strips 14*a* of adhesive 14, each having a given width, are alternatingly arranged in parallel.

As shown in FIGS. 1 and 2, said release material 13 and adhesive 14 to be provided on the back of the top and the bottom label sheets 11 and 12 are plural strips 13*a* and 14*a* of the same width which is narrow relative to the width of the respective label sheets. Strips 13*a* of the release material 13 and strips 14*a* of the adhesive 14 are alternatingly arranged in parallel.

The strips are so arranged that strips 13*a* of the release material 13 on one of the top or the bottom label sheets come in contact with the strips 14*a* of the adhesive 14 on the other of the label sheets so that when the two label sheets are bonded together back-to-back, as shown in FIG. 2, strips 13*a* of the release material 13 on the top label sheet come in contact with the strips 14*a* of the adhesive 14 on the bottom label sheet, and vice versa, to form an integral member. As shown in FIGS. 1 and 2, strips 14*a* are substantially thicker than strips 13*a*.

At each borderline between the strips 13*a* and 14*a* on both the top and the bottom label sheets 11 and 12, a very narrow gap 10 without coating of the adhesive 14 is provided so that the adhesive strips 14*a* do not contact the edge of the next adhesive strip 14*a*.

Figure 3:
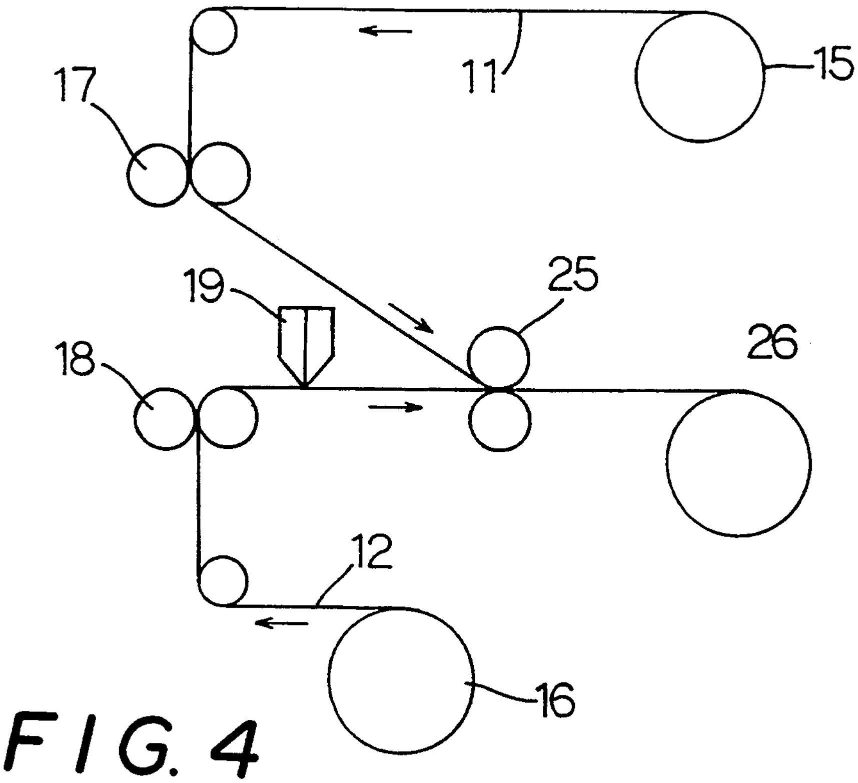
FIG. 3 is a flow chart to show the manufacture of the label according to the present invention.

FIGS. 3 through 6 show specific apparatus for providing narrow gaps 10 between each adhesive strip 14*a*. As shown in FIG. 3, the apparatus comprises an unwinder roll 15 for said top label sheet 11, an unwinder roll 16 for the bottom label sheet 12, and release material coating units 17 and 18 located midway of the label sheet fed from said unwinders 15 and 16 respectively. Release material 13 such as silicone is coated on one side of the top and bottom label sheets 11 and 12, respectively, in the form of strips 13*a* at a given interval.

Figure 4:
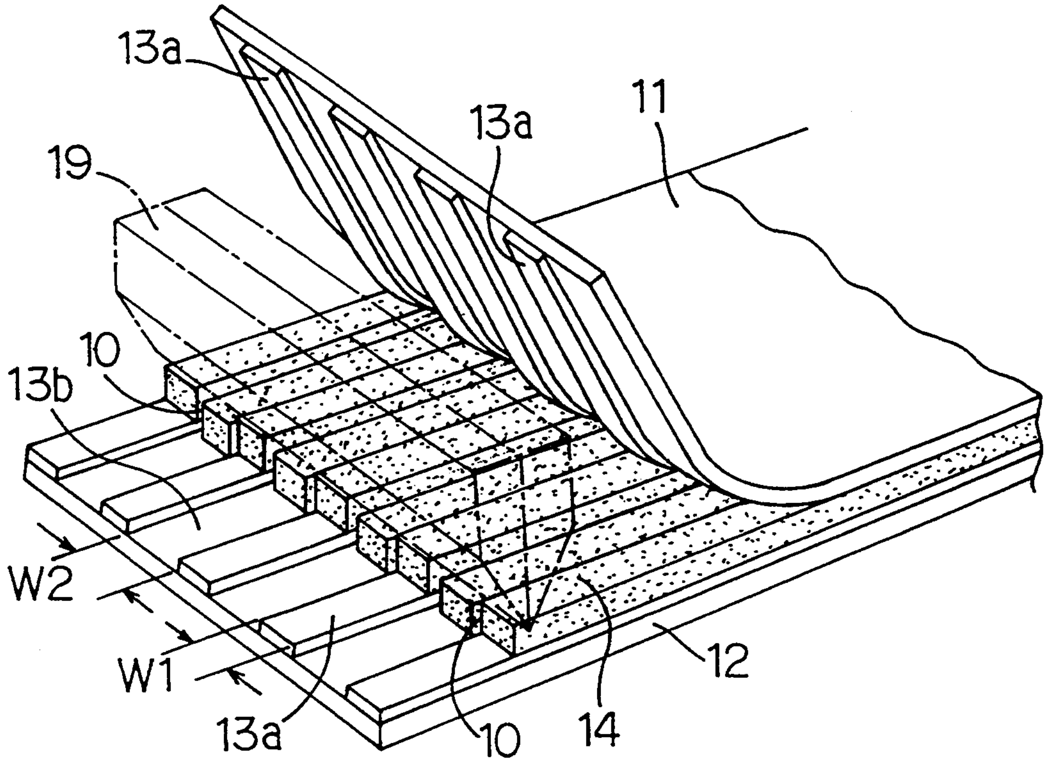
FIG. 4 is a perspective view to show the construction of a label in the process of manufacture.

As shown in FIG. 4, the strips 13*a* of the top label sheet and the strips 13*a* of the bottom sheet 11 and 12 are arranged in a positionally staggering manner so that the strips 13*a* of the top label sheet 11 face the space between strips 13*a* on the bottom label sheet 12. The width W1 of each strip 13*a* is narrower than the width W2 of said space thereof where the release material is not coated, so that when the top and the bottom label sheets 11 and 12 are bonded together, there will be formed a narrow gap 10 between each strip 13*a* of the top label sheet 11 and its counterpart on the bottom sheet 12. As seen in FIG. 4, strips 14*a* are substantially thicker than the strips 13*a* in the direction perpendicular to the width W1.

Figure 5:
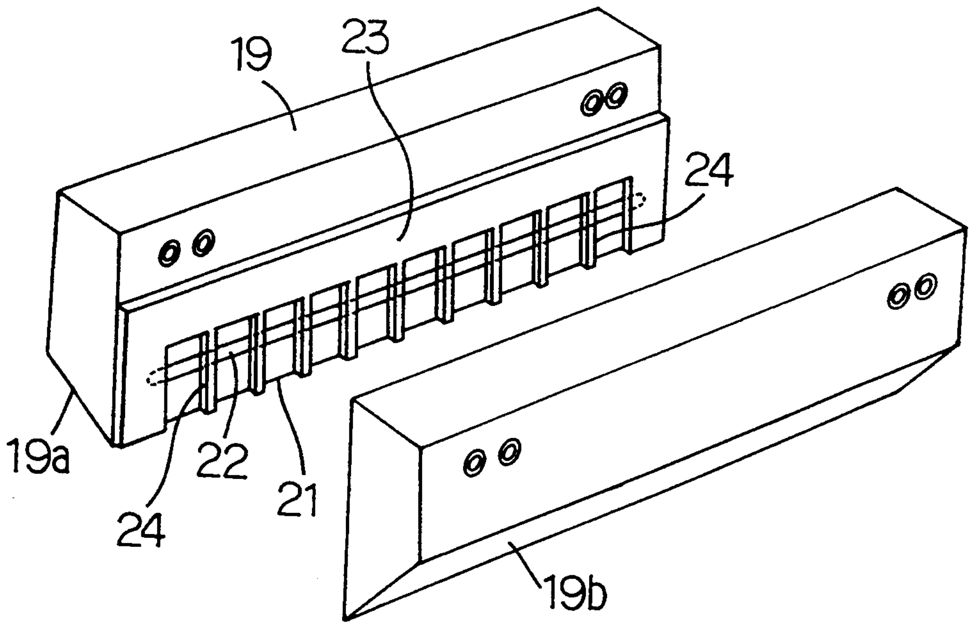
FIG. 5 is a perspective view to show the structure of an adhesive supply device.
Figure 6:
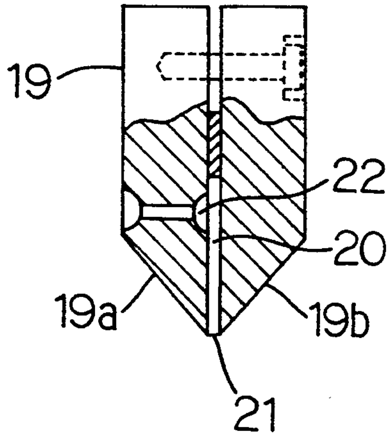
FIG. 6 is a side view to show the adhesive supply device.

Prior to bonding the top and bottom label sheets 11 and 12 provided with said strips 13*a* of release material by using pinch rolls 25 located downstream of the conveyor line as shown in FIG. 3, said adhesive 14 is coated on either one of the label sheets, for example on the bottom label sheet 12, where said strips 13*a* of release material are provided. The adhesive 14 is a hot melt adhesive of rubber or acryl base resin. As shown in FIGS. 5 and 6, a pair of shim holders 19 are disposed facing each other with a very small spacing 20 therebetween. The adhesive 14 is coated on the bottom label sheet 12 through a nozzle 21 located at the bottom of the shim holders 19.

Said shim holders 19 are wider than the width of the top and bottom label sheets 11 and 12. There are provided tapered faces 19*a*, 19*b* on each of the holders 19 that are tapered toward where the holders face each other and where a nozzle 21 is located. At the lower portion of one of the shim holders 19 is provided a horizontal slit 22 for introducing the adhesive 14 from an external means into the spacing 20 between the holders 19.

A comb-like shim plate 23 made of a thin metal plate and provided with plural thin teeth 24 on the lower side is interposed in the spacing 20 between the shim holders 19. The pitch of the teeth 24 is either the same as or slightly narrower than the width of the adhesive strip 14*a*, and each tooth 24 has a width which is the same as or slightly narrower than the width of the narrow gap 10 between the strips 14*a*. Further, the slit 22 runs and opens behind the teeth 24, and the bottom end of each tooth 24 is located at the mouth of the nozzle 21, partially closing the mouth.

When the spacing 14 is introduced through the slit 22 into the interval 20 between the shim holders 19, the adhesive 14 flows between the teeth 24 down through the nozzle 21 and forms strips 14*a* both on the strips 13*a* of the release material provided on the bottom label sheet 12 and in the spaces 13*b* between these strips 13*a* (see FIG. 4), the strips 14*a* being separated by the narrow gaps 10 having the width corresponding to that of said teeth 24.

When the pitch of the teeth 24 on the shim plate 23 is the same as the desired width of the adhesive strip 14*a*, the adhesive 14 fed from the nozzle 21 via the teeth 24 would run and slightly expand due to its viscosity on the strips 13*a* of the bottom label sheet 12 and the space 13*b* between the strips 13*a*, somewhat filling the narrow gap 10 provided between the adhesive strips 14*a*. If the pitch of the teeth 24 of the shim plate 23 is made somewhat smaller than the desired width of the adhesive strips 14*a*, the narrow gaps 10 between the adhesive strips 14*a* can be maintained as designed despite said expansion of the adhesive strips 14*a*. On the other hand, making the width of a tooth 24 somewhat thinner than the that of the narrow gap 10 between the adhesive strips 14a is substantially the same as making the pitch of the teeth 24 slightly smaller than the width of the adhesive strips 14*a*, and thus the narrow gap 10 can be maintained as designed.

Upon forming the adhesive strips 14*a* on the bottom label sheet 12 with narrow gaps 10 therebetween, the top and the bottom sheets 11 and 12 are pasted together by means of the pinch rolls 25 located downstream of the conveyor line. As a result, the adhesive strips 14*a* coated on the spaces 13*b* of the bottom label sheet 12 come in contact with the release strips 13*a* of top label sheet 1, forming a linerless pressure-sensitive label having non-adhesive narrow gaps 10 between the adhesive strips 14*a*. The now combined top and bottom label sheets 11 and 12 are taken up by the winder roll 26 and are then provided with cut-away perforations 27 at a given interval.

Figure 7:
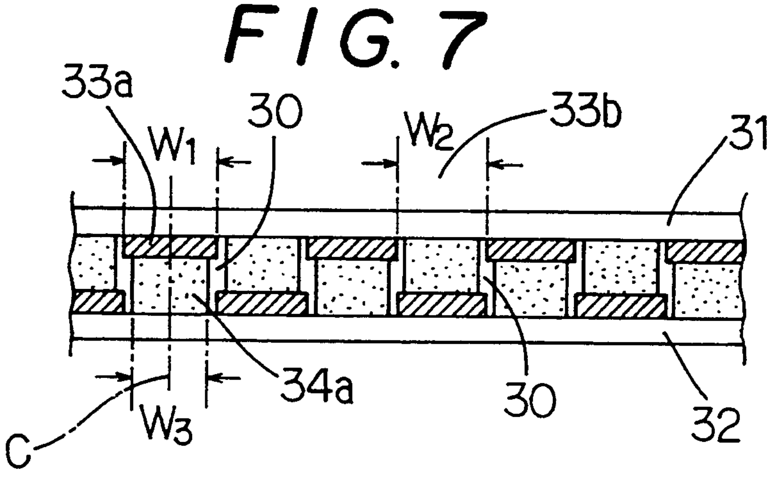
FIG. 7 is a sectional view to show another embodiment of the invention.

FIG. 7 shows another embodiment of the present invention. The width W1 of the strips 33*a* of the release material to be coated on one face of the top and the bottom label sheets 31 and 32 is the same as the width W2 of the space 33*b* between said strips 33*a* where no release material is coated. The width W3 of the strip 34*a* of adhesive to be coated on the strips 33*a* and the space 33*b* on the bottom label sheet 32 is made narrower than said widths W1 and W2. Moreover, the center line C of the strip 34*a* is accurately aligned with the center lines of the strips 33*a* and the space 33*b*. The strips 34*a* are thicker than the strips 33*a* in the direction perpendicular to the width W1.

Thus, even if the width W1 of the strips 33*a* of release material coated in advance on one face of the top and the bottom label sheets 31 and 32 are the same, it is possible to maintain a narrow gap 30 as mentioned above between each strip 34*a* of adhesive if the width of each strip 34*a* is made narrower than the width of the strip 33*a* and the space 33*b* and if they are appropriately arranged with one another with respect to their positional relationship, enabling the top and the bottom label sheets 31 and 32 to be separated without causing threading of adhesive.

Figure 8:
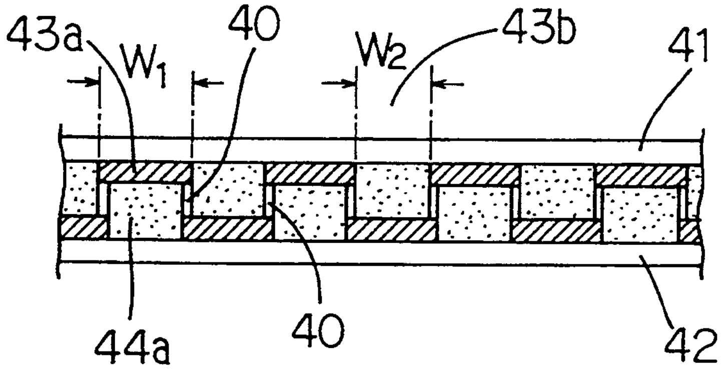
FIG. 8 is a sectional view to show still another embodiment of the invention.

FIG. 8 shows still another embodiment of the present invention. The width W1 of the strips 43*a* to be coated on one face each of the top label sheet 41 and the bottom sheet 42 at a given interval is slightly greater than the width W2 of the space 43*b* on the same face where strips 43*a* of release material are not provided. The strips 44*a* to be coated on said strips 43*a* and the strips 44*a* of adhesive to be coated on said space 43*b* are substantially narrower than the width W1 of the strips 43*a* of release material, so that the strips 44*a* snuggly fit in the width W2 of the space 43*b*. The strips 44*a* are thicker than the strips 43*a* in the direction perpendicular to the width W1.

Because each strip 44*a* of adhesive is narrower than the strip 43*a* of release material, leaving a substantial narrow gap 40 between the adhesive strips 44*a*, the top and the bottom label sheets 41 and 42 can be separated smoothly without causing threading of adhesive.

Various types of adhesives can be used in the present invention label depending on the use of and the kind of paper such as those with heat resistance and those for low temperature uses. It is preferable to provide an adhesion force that can withstand 200 g to 3200 g when pulled apart at the rate of 300 mm per minute in the direction of 180°. The application viscosity is preferably between 163° C./1700 CPS to 163° C./14500 CPS.

Figure 10:
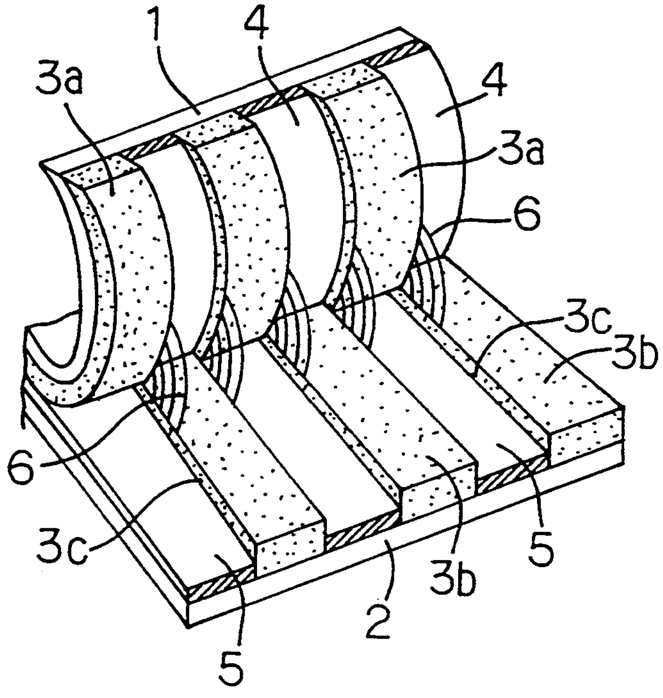
FIG. 10 is a perspective view to show the label sheets of FIG. 9 when they are detached.

As has been described, the strips of adhesive coated on the top label sheet and those on the bottom sheet are separated by a non-adhesive narrow gap and contact the strip of release agent on the other label sheet. It is therefore possible to easily separate the adhesive strips from the corresponding strips of release material at the narrow gap when the top and the bottom label sheets are pulled apart without threading as shown in FIG. 10.

The non-adhesive narrow gaps between the strips of adhesive are secured because the adhesive is accurately applied at predetermined locations on one of the label sheets through the teeth of a shim plate interposed between shim holders. This makes it possible to fully utilize the linerless pressure-sensitive labels of this type which have heretofore not been used in actual situations.

What is claimed is:

1. A linerless pressure-sensitive label comprising:

top and bottom label sheets having mutually facing inner surfaces that are adhered together via an adhesive and a release agent;

strips of release agent provided on an inner surface of said top label sheet and on a mutually facing inner surface of said bottom label sheet, said strips of release agent being provided on said inner surfaces of each of said label sheets with a given spacing between adjacent strips of release agent, said strips of release agent on said top label sheet being positionally staggered from said strips of release agent on said bottom label sheet;

strips of adhesive arranged between said strips of release agent on said top label sheet and said inner surface of said bottom label sheet, and arranged between said strips of release agent on said bottom label sheet and said inner surface of said top label sheet;

said strips of release agent and said strips of adhesive having respective widths in a direction of a plane of said inner surfaces of said top and bottom label sheets, and having respective thicknesses in a direction perpendicular to said inner surfaces of said top and bottom label sheets;

said strips of adhesive on said top label sheet all being separated in a width direction of said strips from strips of adhesive on said bottom label sheet which are adjacent to said strips of adhesive on said top label sheet by means of a non-adhesive narrow gap between said adjacent strips of adhesive; and said strips of adhesive having a thickness which is substantially greater than the thickness of said strips of release agent.

2. The linerless pressure-sensitive label of claim 1, wherein:

said strips of release agent provided on said inner surface of each of said top and bottom label sheets are arranged with a spacing therebetween which is narrower than a width of a space where the release agent is not provided, and are arranged in a positionally staggered manner; and said strips of adhesive have substantially the same width as said strips of release agent, and are provided respectively on said inner surfaces of said top and bottom label sheets where said strips of release agent are provided;

whereby said strips of adhesive are arranged on said inner surface of each of said top and bottom label sheets with a non-adhesive narrow gap between one another.

3. The linerless pressure-sensitive label of claim 2, wherein:

said strips of adhesive provided on said inner surface of each of said top and bottom label sheets with a non-adhesive narrow gap between adjacent strips of adhesive, are applied by supplying adhesive onto said strips of release agent on one of said top and bottom label sheets and are also applied in said space between said strips of release agent on said inner surface of said one of said label top and bottom sheets, said adhesive being supplied through a nozzle formed at a bottom of a pair of shim holders via plural teeth projecting at a regular interval from a shim plate interposed between said shim holders.

4. The linerless pressure-sensitive label of claim 1, wherein:

said strips of release agent provided on said inner surface of each of said top and bottom label sheets are arranged with a spacing therebetween which is the same in width as a space on a same inner surface where said release agent is not provided, said strips of release agent on both label sheets being arranged in a positionally staggered manner; and said strips of adhesive are narrower than said strips of release agent, and are provided respectively on said inner surfaces of said top and bottom label sheets where said strips of release agent are provided;

whereby said strips of adhesive are arranged on said inner surface of each of said top and bottom label sheets with a non-adhesive narrow gap between one another.

5. The linerless pressure-sensitive label of claim 4, wherein:

said strips of adhesive provided on said inner surface of each of said top and bottom label sheets with a non-adhesive narrow gap between adjacent strips of adhesive, are applied by supplying adhesive onto said strips of release agent on one of said top and bottom label sheets and are also applied in said space between said strips of release agent on said inner surface of said one of said label top and bottom sheets, said adhesive being supplied through a nozzle formed at a bottom of a pair of shim holders via plural teeth projecting at a regular interval from a shim plate interposed between said shim holders.

6. The linerless pressure-sensitive label of claim 4, wherein:

said strips of adhesive provided on said inner surface of each of said top and bottom label sheets with a non-adhesive narrow gap between adjacent strips of adhesive, are applied by supplying adhesive onto said strips of release agent on one of said top and bottom label sheets and are also applied in said space between said strips of release agent on said inner surface of said one of said label top and bottom sheets, said adhesive being supplied through a nozzle formed at a bottom of a pair of shim holders via plural teeth projecting at a regular interval from a shim plate interposed between said shim holders.

7. The linerless pressure-sensitive label of claim 1, wherein:

said strips of release agent provided on said inner surface of each of said top and bottom label sheets are arranged with a space therebetween where no release agent is provided, said space where no release agent is provided being narrower than said strips of release agent; and said strips of adhesive are narrower than said strips of release agent, and are provided respectively on said inner surfaces of said top and bottom label sheets such that each strips of adhesive snugly fills in said space;

whereby said strips of adhesive are arranged on said inner surfaces of both of said top and bottom label sheets with a non-adhesive narrow gap between one another.

8. The linerless pressure-sensitive label of claim 1, wherein:

said strips of adhesive provided on said inner surface of each of said top and bottom label sheets with a non-adhesive narrow gap between adjacent strips of adhesive, are applied by supplying adhesive onto said strips of release agent on one of said top and bottom label sheets and are also applied in said space between said strips of release agent on said inner surface of said one of said label top and bottom sheets, said adhesive being supplied through a nozzle formed at a bottom of a pair of shim holders via plural teeth projecting at a regular interval from a shim plate interposed between said shim holders.

9. The linerless pressure-sensitive label of claim 1, wherein said strips of adhesive have a thickness which is at least two times greater than the thickness of said strips of release agent.

10. The linerless pressure-sensitive label of claim 1, wherein said non-adhesive narrow gap has a width which is substantially smaller than the respective widths of said strips of adhesive and said strips of release agent.

* * * * *

UNITED STATES PATENT AND TRADEMARK OFFICE

CERTIFICATE OF CORRECTION

PATENT NO. : 5,336,541

DATED : August 9, 1994

INVENTOR(S) : KOBAYASHI, Junichi

Figure 9:
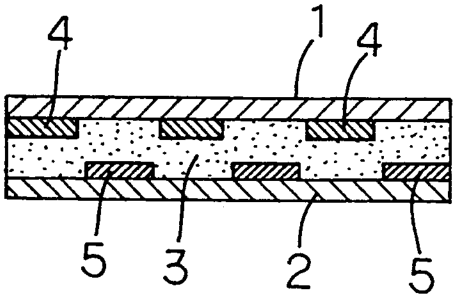
FIG. 9 is a sectional view to show the construction of the prior art label.

It is certified that error appears in the above-indentified patent and that said Letters Patent is hereby corrected as shown below:

In the Drawings:

Drawings, FIG.9 and FIG. 10, should be labeled --(PRIOR ART)--;

Column 4, line 2 after "sheet" (first occurrence), insert --11--; after "sheet" (second occurrence), delete "11 and";

Column 4, line 48, "spacing" should be --adhesive--;

Column 4, line 49, "interval" should be --spacing--.

Signed and Sealed this

Twenty-second Day of October, 1996

Attest:

BRUCE LEHMAN

*Attesting Officer*

*Commissioner of Patents and Trademarks*